March 20, 1928.                                                    1,663,246
J. T. DOOLAN
DRAFT HITCHING DEVICE
Filed May 10, 1926

Inventor
J. T. Doolan
By
E. J. Featherstonhaugh
Atty.

Patented Mar. 20, 1928.

1,663,246

UNITED STATES PATENT OFFICE.

JOHN THOMAS DOOLAN, OF EDMONTON, ALBERTA, CANADA.

DRAFT HITCHING DEVICE.

Application filed May 10, 1926. Serial No. 108,071.

My invention relates to improvements in draft hitching devices, to be attached to binders, mowers and other machines of a similar nature, and has for its object the elimination of all side draft.

I more particularly illustrate the construction of my device by the accompanying drawings, in which.

Similar reference characters refer to similar parts throughout the various views.

Figure 1:
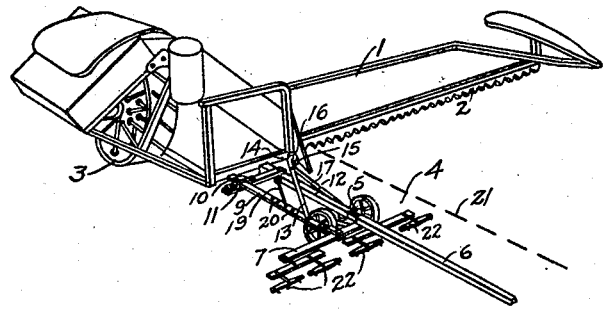
Fig. 1 is a perspective view of the device as hitched to a binder.
Figure 2:
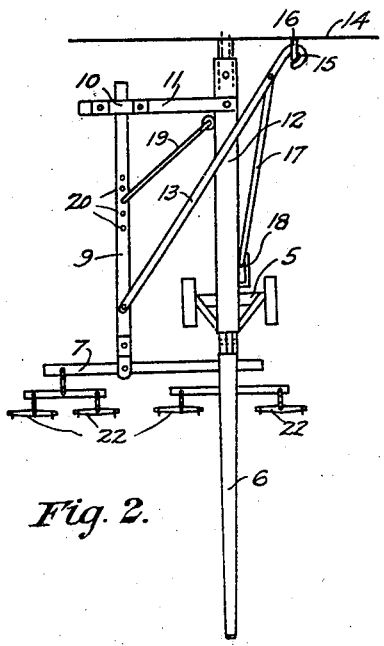
Fig. 2 is a plan view of my device.

1 indicates generally a part of the structure of a typical binder having the cutter 2 and the ground wheel 3 while 4 indicates generally the forecarriage, including the truck 5, pole 6 and whiffletree 7.

Pivotally connected to the whiffletree 7 near the right hand end is a rearwardly extending bar 9 which passes loosely through a sleeve 10 attached to a cross-bar 11 which is pivotally connected to the rear of the stub-end 12 of the truck 5. A diagonal bar 13 connects the forward end of the rearwardly extending bar 9 to the table 14 by a hook end 15 which fits loosely in eye-bolt connection 16 attached to table 14. A bar 17 is pivoted to the rear end of diagonal bar 13 near its connection to the table while the other end slides in a slot 18 bolter solid to front end of stub-end 12 of truck 5. A bar 19 runs diagonally from rear end of stub-end 12 of truck to a forward position on the rearwardly extending bar 9 and having its end bent over in the form of a hook and which engages with slots 20 which adjusts the line of draft. The whiffletree 7 is attached to the forward end of the rearwardly extending bar 9 and the whole arrangement is entirely independent of the truck, allowing a free movement of the draft device.

It will be seen from the drawings that the pull of a team of horses is applied to rearwardly extending bar 9 which is the line of draft and this pull is transmitted to the binder by the diagonal bar connection 13 which keeps the rearwardly extending bar 9 at right angles to the face of the binder table and parallel to the grain line 21, thereby eliminating all side draft and at the same time allows the binder to be turned at any angle without any side pull. With this arrangement it allows of the present truck connection and only requires one horse to the innerside of the pole, between it and the grain line, and any number required to the outerside of the pole without altering the line of draft. In this instance I have shown three of the singletrees 22 to the outerside of the pole while there is only one between the pole and the grain line.

The rod connection 19 which is attached to an eye-bolt at rear of stub-end of the truck and hooks into slots on the rearwardly extending bar 9 acts as a brace and tends to keep the perfect line of draft and is the means used for turning the binder as it keeps the rearwardly extending bar 9 sliding in the sleeve 10 in an approximately straight line.

Bar 17 which is connected to rear end of diagonal bar 13 and having its forward end sliding in slot attached to the front end of stub-end of truck overcomes any side pressure which might be caused by bar 19 acting on truck 5 as when the pull is exerted the bar 17 slides forward to the front end of the slot which checks any tendency of the truck swinging in towards the grain line and keeps the straight line of draft.

What I claim as my invention is:

In a draft hitching device, a binder frame, a pole, an equalizing bar and single trees secured thereto, a truck frame suitably secured to the binder frame and supported by running gear and comprising a main beam, a parallel bar pivotally secured to said equalizing bar and a pivoted transverse bar having a guide slot for the said parallel bar slidable therein, a draw bar from said parallel bar to said binder frame braced by a rod self adjustably connected to the main truck beam, and a draw bar from said main truck beam adjustably secured to said parallel bar.

Signed at the city of Edmonton, this 8th day of February, 1926.

JOHN THOMAS DOOLAN.